US011726493B2

(12) United States Patent
Dolgov et al.

(10) Patent No.: US 11,726,493 B2
(45) Date of Patent: *Aug. 15, 2023

(54) MODIFYING BEHAVIOR OF AUTONOMOUS VEHICLES BASED ON SENSOR BLIND SPOTS AND LIMITATIONS

(71) Applicant: Waymo LLC, Mountain View, CA (US)

(72) Inventors: Dmitri A. Dolgov, Los Altos, CA (US); Christopher Paul Urmson, Mountain View, CA (US)

(73) Assignee: Waymo LLC, Mountain View, CA (US)

(*) Notice: Subject to any disclaimer, the term of this patent is extended or adjusted under 35 U.S.C. 154(b) by 0 days.

This patent is subject to a terminal disclaimer.

(21) Appl. No.: 17/512,770

(22) Filed: Oct. 28, 2021

(65) Prior Publication Data

US 2022/0050474 A1    Feb. 17, 2022

Related U.S. Application Data

(63) Continuation of application No. 16/773,606, filed on Jan. 27, 2020, now Pat. No. 11,188,092, which is a
(Continued)

(51) Int. Cl.
*G05D 1/02* (2020.01)
*B60W 30/18* (2012.01)
*B60W 50/00* (2006.01)

(52) U.S. Cl.
CPC ......... *G05D 1/0274* (2013.01); *G05D 1/0248* (2013.01); *G05D 1/0257* (2013.01);
(Continued)

(58) Field of Classification Search
CPC .. G05D 1/0274; G05D 1/0248; G05D 1/0257; G05D 1/0276; G05D 2201/0213;
(Continued)

(56) References Cited

U.S. PATENT DOCUMENTS 5,644,386 A    7/1997  Jenkins et al.
6,526,352 B1   2/2003  Breed et al.
(Continued)

FOREIGN PATENT DOCUMENTS

CA    2824606 A1    7/2012
CN  101915991 A    12/2010
(Continued)

OTHER PUBLICATIONS

Notification of First Office Action for Chinese Patent Application No. 201480010362.7, dated Nov. 30, 2016.
(Continued)

*Primary Examiner* — Donald J Wallace
(74) *Attorney, Agent, or Firm* — McDonnell Boehnen Hulbert & Berghoff LLP

(57) ABSTRACT

Models can be generated of a vehicle's view of its environment and used to maneuver the vehicle. This view need not include what objects or features the vehicle is actually seeing, but rather those areas that the vehicle is able to observe using its sensors if the sensors were completely un-occluded. For example, for each of a plurality of sensors of the object detection component, a computer may generate an individual 3D model of that sensor's field of view. Weather information is received and used to adjust one or more of the models. After this adjusting, the models may be aggregated into a comprehensive 3D model. The comprehensive model may be combined with detailed map information indicating the probability of detecting objects at different locations. The model of the vehicle's environment may be computed based on the combined comprehensive 3D model and detailed map information.

20 Claims, 15 Drawing Sheets

Related U.S. Application Data continuation of application No. 15/718,794, filed on Sep. 28, 2017, now Pat. No. 10,663,975, which is a continuation of application No. 15/137,120, filed on Apr. 25, 2016, now Pat. No. 9,811,091, which is a continuation of application No. 13/749,793, filed on Jan. 25, 2013, now Pat. No. 9,367,065.

(52) U.S. Cl.
CPC ..... *G05D 1/0276* (2013.01); *B60W 30/18154* (2013.01); *B60W 2050/0095* (2013.01); *B60W 2555/20* (2020.02); *G05D 2201/0213* (2013.01)

(58) Field of Classification Search
CPC ... B60W 30/18154; B60W 2050/0095; B60W 2555/20
See application file for complete search history.

(56) References Cited

U.S. PATENT DOCUMENTS

| | | | |
|---|---|---|---|
| 7,209,221 B2 | 4/2007 | Breed et al. | |
| 7,630,806 B2 | 12/2009 | Breed | |
| 7,912,633 B1 | 3/2011 | Dietsch et al. | |
| 8,340,438 B2 | 12/2012 | Anderson | |
| 8,532,862 B2 | 9/2013 | Neff | |
| 8,571,743 B1 | 10/2013 | Cullinane | |
| 8,612,135 B1 | 12/2013 | Montemerlo et al. | |
| 9,367,065 B2 | 6/2016 | Dolgov et al. | |
| 9,811,091 B2* | 11/2017 | Dolgov | G05D 1/0257 |
| 9,840,253 B1 | 12/2017 | Prasad et al. | |
| 10,663,975 B2 | 5/2020 | Dolgov et al. | |
| 11,188,092 B2* | 11/2021 | Dolgov | G05D 1/0257 |
| 2002/0005778 A1 | 1/2002 | Breed et al. | |
| 2007/0182816 A1 | 8/2007 | Fox | |
| 2007/0280669 A1 | 12/2007 | Karim | |
| 2008/0007429 A1 | 1/2008 | Kawasaki et al. | |
| 2008/0027591 A1 | 1/2008 | Lenser et al. | |
| 2008/0046150 A1 | 2/2008 | Breed | |
| 2008/0158256 A1 | 7/2008 | Russell et al. | |
| 2008/0162004 A1 | 7/2008 | Price et al. | |
| 2008/0262669 A1 | 10/2008 | Smid et al. | |
| 2009/0326735 A1 | 12/2009 | Wood et al. | |
| 2010/0048242 A1 | 2/2010 | Rhoads et al. | |
| 2010/0106356 A1 | 4/2010 | Trepagnier et al. | |
| 2010/0253539 A1 | 10/2010 | Seder et al. | |
| 2010/0253543 A1 | 10/2010 | Szczerba et al. | |
| 2010/0253598 A1 | 10/2010 | Szczerba et al. | |
| 2010/0256836 A1 | 10/2010 | Mudalige | |
| 2011/0150348 A1 | 6/2011 | Anderson | |
| 2011/0299734 A1 | 12/2011 | Bodenmueller | |
| 2012/0083982 A1 | 4/2012 | Bonefas et al. | |
| 2012/0095651 A1 | 4/2012 | Anderson | |
| 2012/0232787 A1 | 9/2012 | Kunath et al. | |
| 2013/0010111 A1 | 1/2013 | Laforte et al. | |
| 2013/0163879 A1 | 6/2013 | Katz et al. | |
| 2013/0218449 A1 | 8/2013 | Hymel et al. | |
| 2013/0300911 A1 | 11/2013 | Beckman | |
| 2014/0098231 A1 | 4/2014 | Buley et al. | |
| 2016/0266581 A1 | 9/2016 | Dolgov et al. | |

FOREIGN PATENT DOCUMENTS

| | | |
|---|---|---|
| CN | 102679994 A | 9/2012 |
| EP | 2498059 A1 | 9/2012 |
| EP | 2881697 A1 | 6/2015 |
| JP | 2000339494 A | 12/2000 |
| JP | 2005138764 A | 6/2005 |
| JP | 2017207340 A | 11/2017 |
| WO | 2013006826 A2 | 1/2013 |

OTHER PUBLICATIONS

Bakambu et al., "Autonomous System for Exploration and Navigation in Draft Networks", Jun. 14-17, 2004, IEEE Intelligent Vehicles Symposium, 6 pages.

International Search Report and Written Opinion for Application No. PCT/US2014/012020 dated May 9, 2014.

Extended Search Report dated Sep. 6, 2016, for European Patent Application No. 14743710.7.

Decision to Grant for Japanese Patent Application No. 2015-555195 dated Apr. 27, 2016.

* cited by examiner

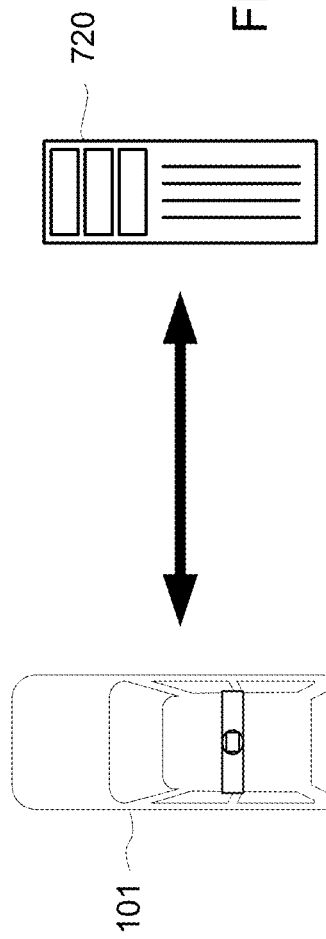
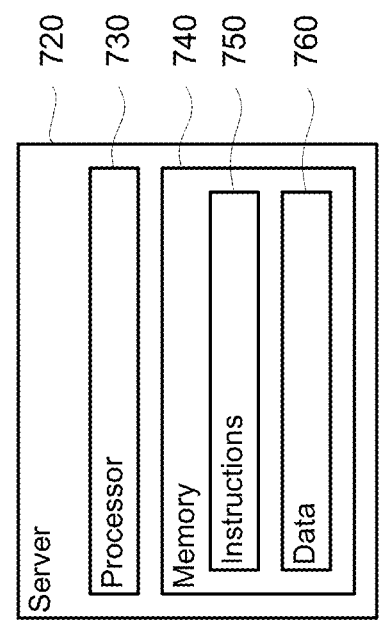
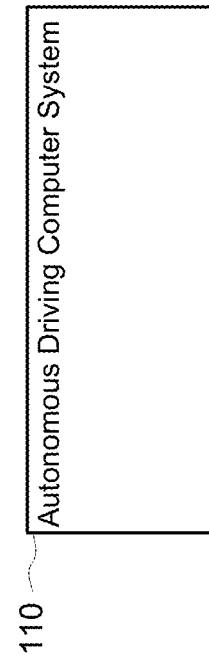
FIGURE 7A
FIGURE 7B

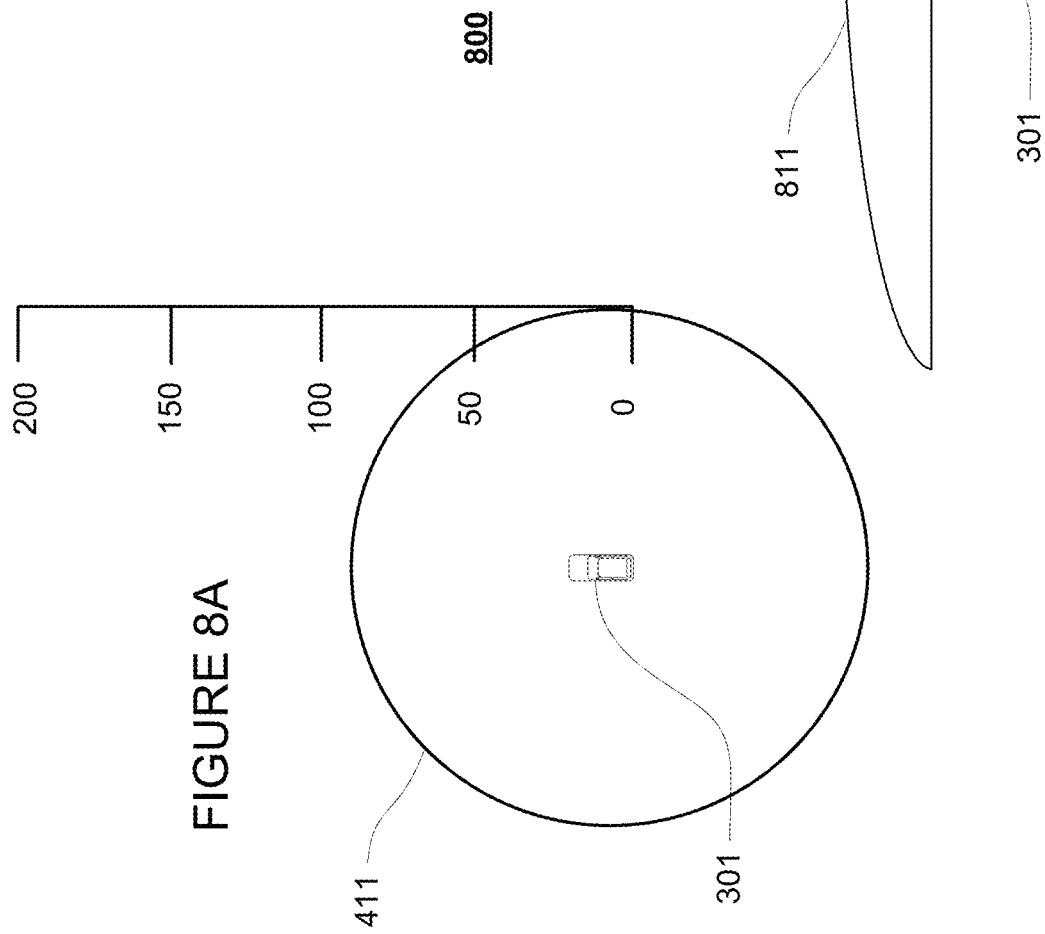

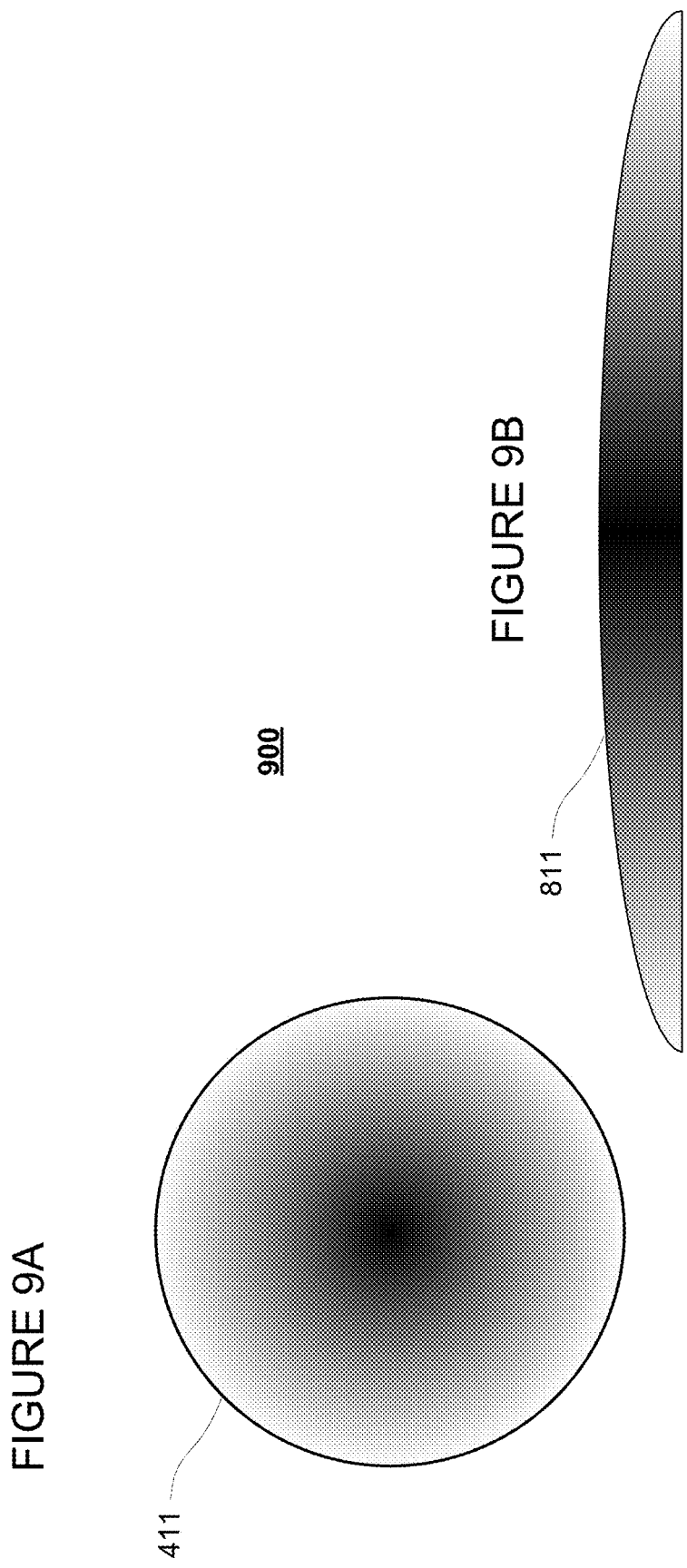

MODIFYING BEHAVIOR OF AUTONOMOUS VEHICLES BASED ON SENSOR BLIND SPOTS AND LIMITATIONS

CROSS-REFERENCE TO RELATED APPLICATIONS

This application is a continuation of U.S. application Ser. No. 16/773,606, filed Jan. 27, 2020, which is a continuation of U.S. application Ser. No. 15/718,794, filed Sep. 28, 2017, which is a continuation of U.S. application Ser. No. 15/137,120, filed on Apr. 25, 2016, which is a continuation of U.S. application Ser. No. 13/749,793, filed on Jan. 25, 2013. The foregoing applications are incorporated herein by reference.

BACKGROUND

Autonomous vehicles use various computing systems to aid in the transport of passengers from one location to another. Some autonomous vehicles may require some initial input or continuous input from an operator, such as a pilot, driver, or passenger. Other systems, for example autopilot systems, may be used only when the system has been engaged, which permits the operator to switch from a manual mode (where the operator exercises a high degree of control over the movement of the vehicle) to an autonomous mode (where the vehicle essentially drives itself) to modes that lie somewhere in between.

Such vehicles are equipped with various types of sensors in order to detect objects in the surroundings. For example, autonomous vehicles may include lasers, sonar, radar, cameras, and other devices which scan and record data from the vehicle's surroundings. These devices in combination (and in some cases alone) may be used to build 3D models of the objects detected in the vehicle's surrounding.

In addition to modeling and detecting objects in the vehicle's surroundings, autonomous vehicles need to reason about the parts of the world that are not seen by these sensors (e.g., due to occlusions) to drive safely. Without taking into account the limitations of these sensors, this may lead to dangerous maneuvers such as passing around blind corners, moving into spaces that are partially occluded by other objects, etc.

SUMMARY

One aspect of the disclosure provides a method. The method includes generating, for each given sensor of a plurality of sensors for detecting objects in a vehicle's environment, a 3D model of the given sensor's field of view; receiving weather information including one or more of reports, radar information, forecasts and real-time measurements concerning actual or expected weather conditions in the vehicle's environment; adjusting one or more characteristics of the plurality of 3D models based on the received weather information to account for an impact of the actual or expected weather conditions on one or more of the plurality of sensors; after the adjusting, aggregating, by a processor, the plurality of 3D models to generate a comprehensive 3D model; combining the comprehensive 3D model with detailed map information; and using the combined comprehensive 3D model with detailed map information to maneuver the vehicle.

In one example, the 3D model of each given sensor's field of view is based on a pre-determined model of the given sensor's unobstructed field of view. In another example, the 3D model for each given sensor's field of view is based on the given sensor's location and orientation relative to the vehicle. In another example, the weather information is received from a remote computer via a network. In another example, the weather information is received from one of the plurality of sensors. In another example, at least one model of the plurality of 3D models includes probability data indicating a probability of detecting an object at a given location of the at least one model, and this probability data is used when aggregating the plurality of 3D models to generate the comprehensive 3D model. In another example, the detailed map information includes probability data indicating a probability of detecting an object at a given location of the map, and this probability data is used when combining the comprehensive 3D model with detailed map information. In another example, combining the comprehensive 3D model with detailed map information results in a model of the vehicle's environment annotated with information describing whether various portions of the environment are occupied, unoccupied, or unobserved.

Another aspect of the disclosure provides a system. The system includes a processor configured to generate, for each given sensor of a plurality of sensors for detecting objects in a vehicle's environment, a 3D model of the given sensor's field of view; receive weather information including one or more of reports, radar information, forecasts and real-time measurements concerning actual or expected weather conditions in the vehicle's environment; adjust one or more characteristics of the plurality of 3D models based on the received weather information to account for an impact of the actual or expected weather conditions on one or more of the plurality of sensors; after the adjusting, aggregate the plurality of 3D models to generate a comprehensive 3D model; combine the comprehensive 3D model with detailed map information; and use the combined comprehensive 3D model with detailed map information to maneuver the vehicle.

In one example, the 3D model of each given sensor's field of view is based on a pre-determined model of the given sensor's unobstructed field of view. In another example, the 3D model for each given sensor's field of view is based on the given sensor's location and orientation relative to the vehicle. In another example, the weather information is received from a remote computer via a network. In another example, the weather information is received from one of the plurality of sensors. In another example, at least one model of the plurality of 3D models includes probability data indicating a probability of detecting an object at a given location of the at least one model, and this probability data is used when aggregating the plurality of 3D models to generate the comprehensive 3D model. In another example, the detailed map information includes probability data indicating a probability of detecting an object at a given location of the map, and this probability data is used when combining the comprehensive 3D model with detailed map information. In another example, combining the comprehensive 3D model with detailed map information results in a model of the vehicle's environment annotated with information describing whether various portions of the environment are occupied, unoccupied, or unobserved.

A further aspect of the disclosure provides a tangible, non-transitory computer-readable storage medium on which computer readable instructions of a program are stored. The instructions, when executed by a processor, cause the processor to perform a method. The method includes generating, for each given sensor of a plurality of sensors for detecting objects in a vehicle's environment, a 3D model of the given sensor's field of view; receiving weather information including one or more of reports, radar information, forecasts and real-time measurements concerning actual or expected weather conditions in the vehicle's environment; adjusting one or more characteristics of the plurality of 3D models based on the received weather information to account for an impact of the actual or expected weather conditions on one or more of the plurality of sensors; after the adjusting, aggregating the plurality of 3D models to generate a comprehensive 3D model; combining the comprehensive 3D model with detailed map information; and using the combined comprehensive 3D model with detailed map information to maneuver the vehicle.

In one example, the 3D model of each given sensor's field of view is based on a pre-determined model of the given sensor's unobstructed field of view. In another example, at least one model of the plurality of 3D models includes probability data indicating a probability of detecting an object at a given location of the at least one model, and this probability data is used when aggregating the plurality of 3D models to generate the comprehensive 3D model. In another example, the detailed map information includes probability data indicating a probability of detecting an object at a given location of the map, and this probability data is used when combining the comprehensive 3D model with detailed map information.

BRIEF DESCRIPTION OF THE DRAWINGS

FIG. 7A is a pictorial diagram of a system in accordance with aspects of the disclosure.

FIG. 7B is a functional diagram of a system in accordance with aspects of the disclosure.

FIGS. 8A and 8B are examples of the components of a 3D model for a sensor in accordance with aspects of the disclosure.

FIGS. 9A and 9B are other examples of the components of a 3D model for a sensor in accordance with aspects of the disclosure.

DETAILED DESCRIPTION

Aspects of the present disclosure relate generally to modeling a vehicle's current view of its environment. This view need not include what objects or features the vehicle is actually seeing, but rather those areas that the vehicle is able to observe using its sensors if the sensors were completely un-occluded. For example, for each of a plurality of sensors of the object detection component, a computer may an individual 3D model of that sensor's field of view. Weather information is received and used to adjust one or more of the models. After this adjusting, the models may be aggregated into a comprehensive 3D model. The comprehensive model may be combined with detailed map information indicating the probability of detecting objects at different locations. A model of the vehicle's environment may be computed based on the combined comprehensive 3D model and detailed map information and may be used to maneuver the vehicle.

Figure 1:
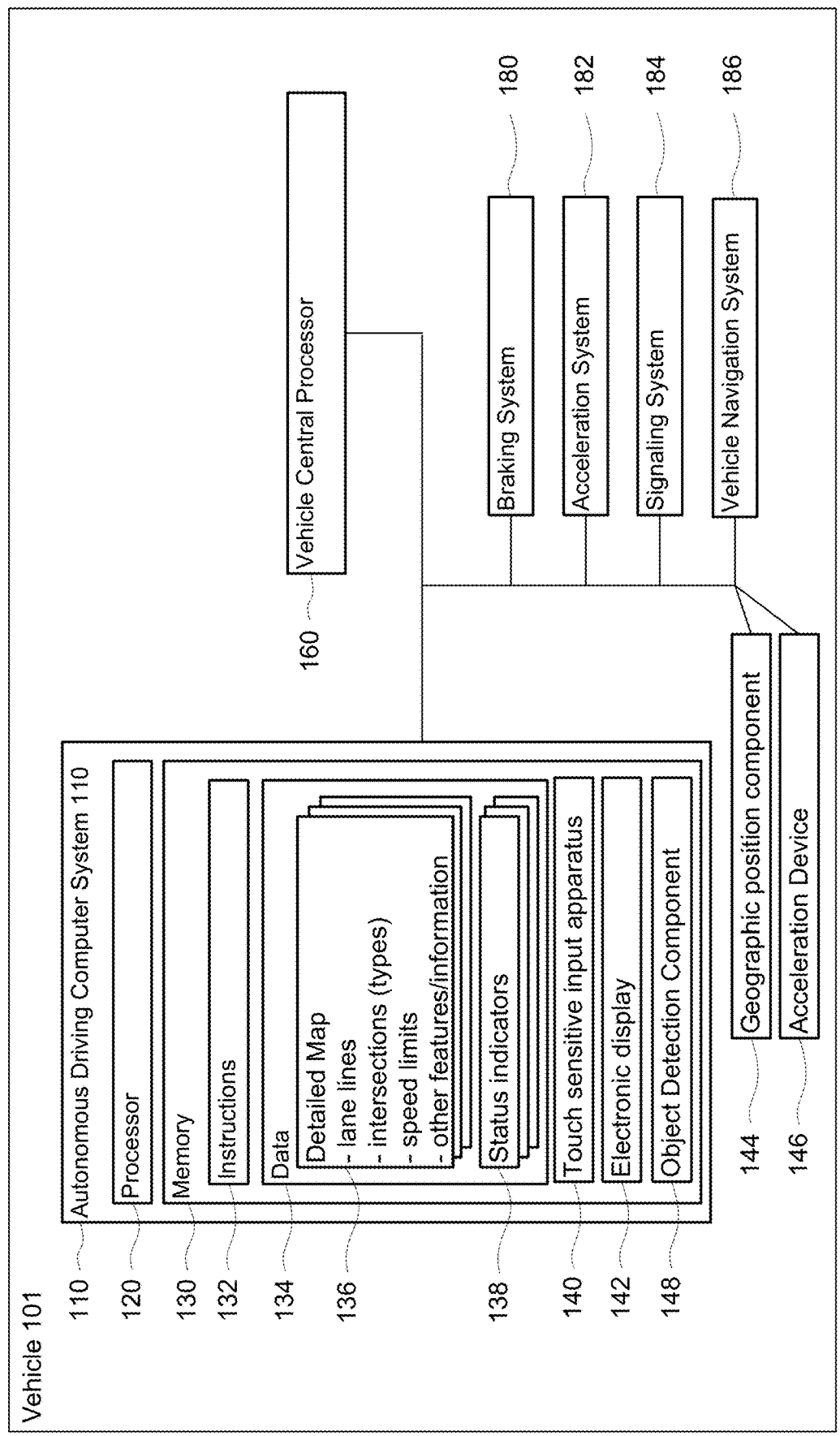
FIG. 1 is a functional diagram of a system in accordance with an exemplary embodiment.

As shown in FIG. 1, an autonomous driving system 100 in accordance with one aspect of the disclosure includes a vehicle 101 with various components. While certain aspects of the disclosure are particularly useful in connection with specific types of vehicles, the vehicle may be any type of vehicle including, but not limited to, cars, trucks, motorcycles, busses, boats, airplanes, helicopters, lawnmowers, recreational vehicles, amusement park vehicles, farm equipment, construction equipment, trams, golf carts, trains, and trolleys. The vehicle may have one or more computers, such as computer 110 containing a processor 120, memory 130 and other components typically present in general purpose computers.

The memory 130 stores information accessible by processor 120, including instructions 132 and data 134 that may be executed or otherwise used by the processor 120. The memory 130 may be of any type capable of storing information accessible by the processor, including a computer-readable medium, or other medium that stores data that may be read with the aid of an electronic device, such as a hard-drive, memory card, ROM, RAM, DVD or other optical disks, as well as other write-capable and read-only memories. Systems and methods may include different combinations of the foregoing, whereby different portions of the instructions and data are stored on different types of media.

The instructions 132 may be any set of instructions to be executed directly (such as machine code) or indirectly (such as scripts) by the processor. For example, the instructions may be stored as computer code on the computer-readable medium. In that regard, the terms "instructions" and "programs" may be used interchangeably herein. The instructions may be stored in object code format for direct processing by the processor, or in any other computer language including scripts or collections of independent source code modules that are interpreted on demand or compiled in advance. Functions, methods and routines of the instructions are explained in more detail below.

The data 134 may be retrieved, stored or modified by processor 120 in accordance with the instructions 132. For instance, although the claimed subject matter is not limited by any particular data structure, the data may be stored in computer registers, in a relational database as a table having a plurality of different fields and records, XML documents or flat files. The data may also be formatted in any computer-readable format. By further way of example only, image data may be stored as bitmaps comprised of grids of pixels that are stored in accordance with formats that are compressed or uncompressed, lossless (e.g., BMP) or lossy (e.g., JPEG), and bitmap or vector-based (e.g., SVG), as well as computer instructions for drawing graphics. The data may comprise any information sufficient to identify the relevant information, such as numbers, descriptive text, proprietary codes, references to data stored in other areas of the same memory or different memories (including other network locations) or information that is used by a function to calculate the relevant data.

The processor 120 may be any conventional processor, such as commercially available CPUs. Alternatively, the processor may be a dedicated device such as an ASIC or other hardware-based processor. Although FIG. 1 functionally illustrates the processor, memory, and other elements of computer 110 as being within the same block, it will be understood by those of ordinary skill in the art that the processor, computer, or memory may actually comprise multiple processors, computers, or memories that may or may not be stored within the same physical housing. For example, memory may be a hard drive or other storage media located in a housing different from that of computer 110. Accordingly, references to a processor or computer will be understood to include references to a collection of processors or computers or memories that may or may not operate in parallel. Rather than using a single processor to perform the steps described herein, some of the components, such as steering components and deceleration components, may each have their own processor that only performs calculations related to the component's specific function.

In various aspects described herein, the processor may be located remote from the vehicle and communicate with the vehicle wirelessly. In other aspects, some of the processes described herein are executed on a processor disposed within the vehicle and others by a remote processor, including taking the steps necessary to execute a single maneuver.

Computer 110 may all of the components normally used in connection with a computer such as a central processing unit (CPU), memory (e.g., RAM and internal hard drives) storing data 134 and instructions such as a web browser, an electronic display 142 (e.g., a monitor having a screen, a small LCD touch-screen or any other electrical device that is operable to display information), user input 140 (e.g., a mouse, keyboard, touch screen and/or microphone), as well as various sensors (e.g., a video camera) for gathering explicit (e.g., a gesture) or implicit (e.g., "the person is asleep") information about the states and desires of a person.

Figure 2:
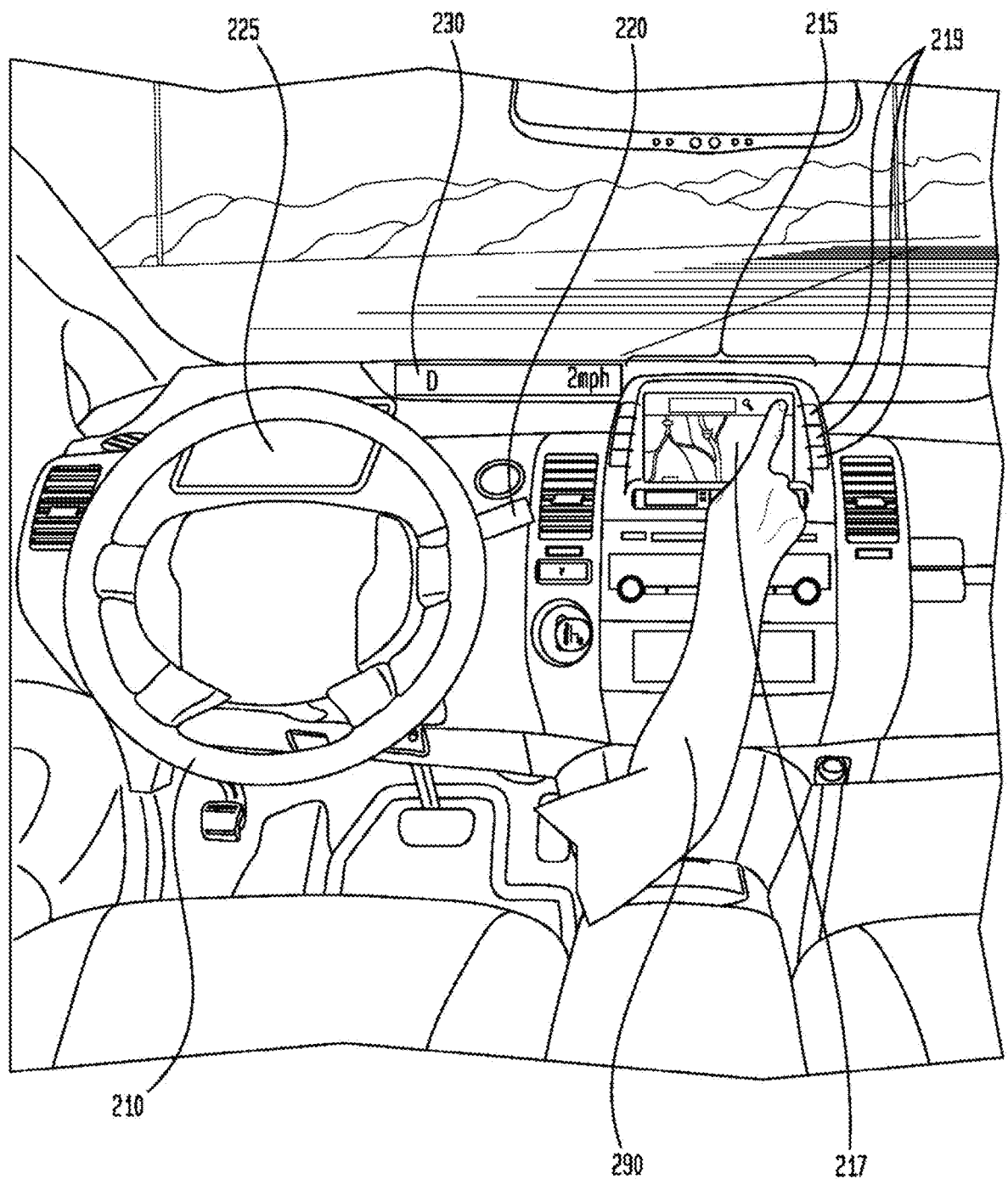
FIG. 2 is an interior of an autonomous vehicle in accordance with an exemplary embodiment.

In one example, computer 110 may be an autonomous driving computing system incorporated into vehicle 101. FIG. 2 depicts an exemplary design of the interior of an autonomous vehicle. The autonomous vehicle may include all of the features of a non-autonomous vehicle, for example: a steering apparatus, such as steering wheel 210; a navigation display apparatus, such as navigation display 215; and a gear selector apparatus, such as gear shifter 220. The vehicle may also have various user input devices, such as gear shifter 220, touch screen 217, or button inputs 219, for activating or deactivating one or more autonomous driving modes and for enabling a driver or passenger 290 to provide information, such as a navigation destination, to the autonomous driving computer 110.

The autonomous driving computing system may capable of communicating with various components of the vehicle. For example, returning to FIG. 1, computer 110 may be in communication with the vehicle's central processor 160 and may send and receive information from the various systems of vehicle 101, for example the braking 180, acceleration 182, signaling 184, and navigation 186 systems in order to control the movement, speed, etc. of vehicle 101. In addition, when engaged, computer 110 may control some or all of these functions of vehicle 101 and thus be fully or merely partially autonomous. It will be understood that although various systems and computer 110 are shown within vehicle 101, these elements may be external to vehicle 101 or physically separated by large distances.

The vehicle may also include a geographic position component 144 in communication with computer 110 for determining the geographic location of the device. For example, the position component may include a GPS receiver to determine the device's latitude, longitude and/or altitude position. Other location systems such as laser-based localization systems, inertial-aided GPS, or camera-based localization may also be used to identify the location of the vehicle. The location of the vehicle may include an absolute geographical location, such as latitude, longitude, and altitude as well as relative location information, such as location relative to other cars immediately around it which can often be determined with less noise that absolute geographical location.

The vehicle may also include other devices in communication with computer 110, such as an accelerometer, gyroscope or another direction/speed detection device 146 to determine the direction and speed of the vehicle or changes thereto. By way of example only, acceleration device 146 may determine its pitch, yaw or roll (or changes thereto) relative to the direction of gravity or a plane perpendicular thereto. The device may also track increases or decreases in speed and the direction of such changes. The device's provision of location and orientation data as set forth herein may be provided automatically to the user, computer 110, other computers and combinations of the foregoing.

The computer 110 may control the direction and speed of the vehicle by controlling various components. By way of example, if the vehicle is operating in a completely autonomous mode, computer 110 may cause the vehicle to accelerate (e.g., by increasing fuel or other energy provided to the engine), decelerate (e.g., by decreasing the fuel supplied to the engine or by applying brakes) and change direction (e.g., by turning the front two wheels).

The vehicle may also include components for detecting objects external to the vehicle such as other vehicles, obstacles in the roadway, traffic signals, signs, trees, etc. The detection system may include lasers, sonar, radar, cameras or any other detection devices which record data which may be processed by computer 110. For example, if the vehicle is a small passenger vehicle, the car may include a laser mounted on the roof or other convenient location.

Figure 3:
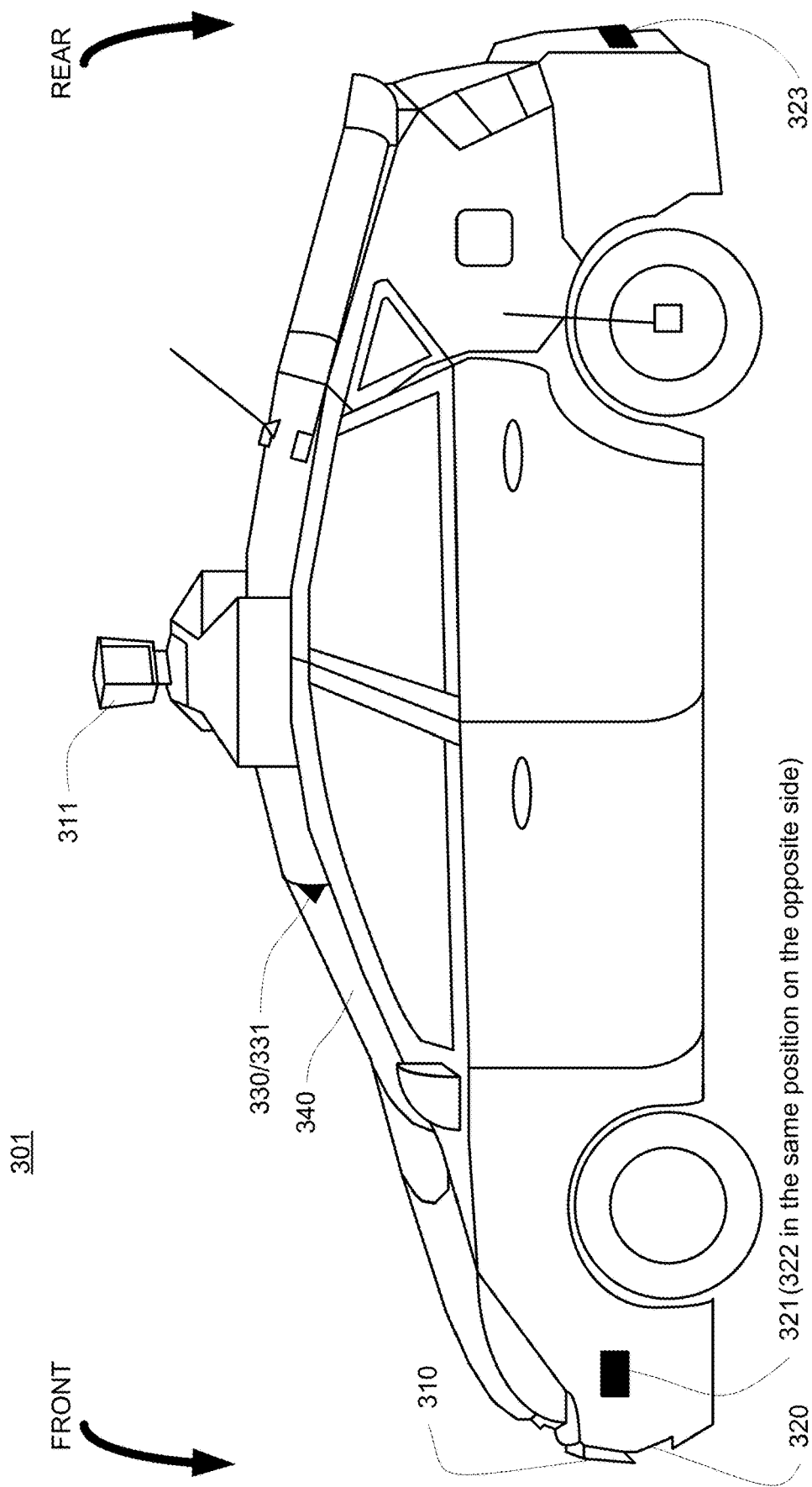
FIG. 3 is an exterior of an autonomous vehicle in accordance with aspects of the disclosure.

As shown in FIG. 3, small passenger vehicle 301 may include lasers 310 and 311, mounted on the front and top of the vehicle, respectively. Laser 310 may have a range of approximately 150 meters, a thirty degree vertical field of view, and approximately a thirty degree horizontal field of view. Laser 311 may have a range of approximately 50-80 meters, a thirty degree vertical field of view, and a 360 degree horizontal field of view. The lasers may provide the vehicle with range and intensity information which the computer may use to identify the location and distance of various objects. In one aspect, the lasers may measure the distance between the vehicle and the object surfaces facing the vehicle by spinning on its axis and changing its pitch.

The vehicle may also include various radar detection units, such as those used for adaptive cruise control systems. The radar detection units may be located on the front and back of the car as well as on either side of the front bumper. As shown in the example of FIG. 3, vehicle 301 includes radar detection units 320-323 located on the side (only one side being shown), front and rear of the vehicle. Each of these radar detection units may have a range of approximately 200 meters for an approximately 18 degree field of view as well as a range of approximately 60 meters for an approximately 56 degree field of view.

In another example, a variety of cameras may be mounted on the vehicle. The cameras may be mounted at predetermined distances so that the parallax from the images of 2 or more cameras may be used to compute the distance to various objects. As shown in FIG. 3, vehicle 301 may include 2 cameras 330-331 mounted under a windshield 340 near the rear view mirror (not shown). Camera 330 may include a range of approximately 200 meters and an approximately 30 degree horizontal field of view, while camera 331 may include a range of approximately 100 meters and an approximately 60 degree horizontal field of view.

Figure 4A:
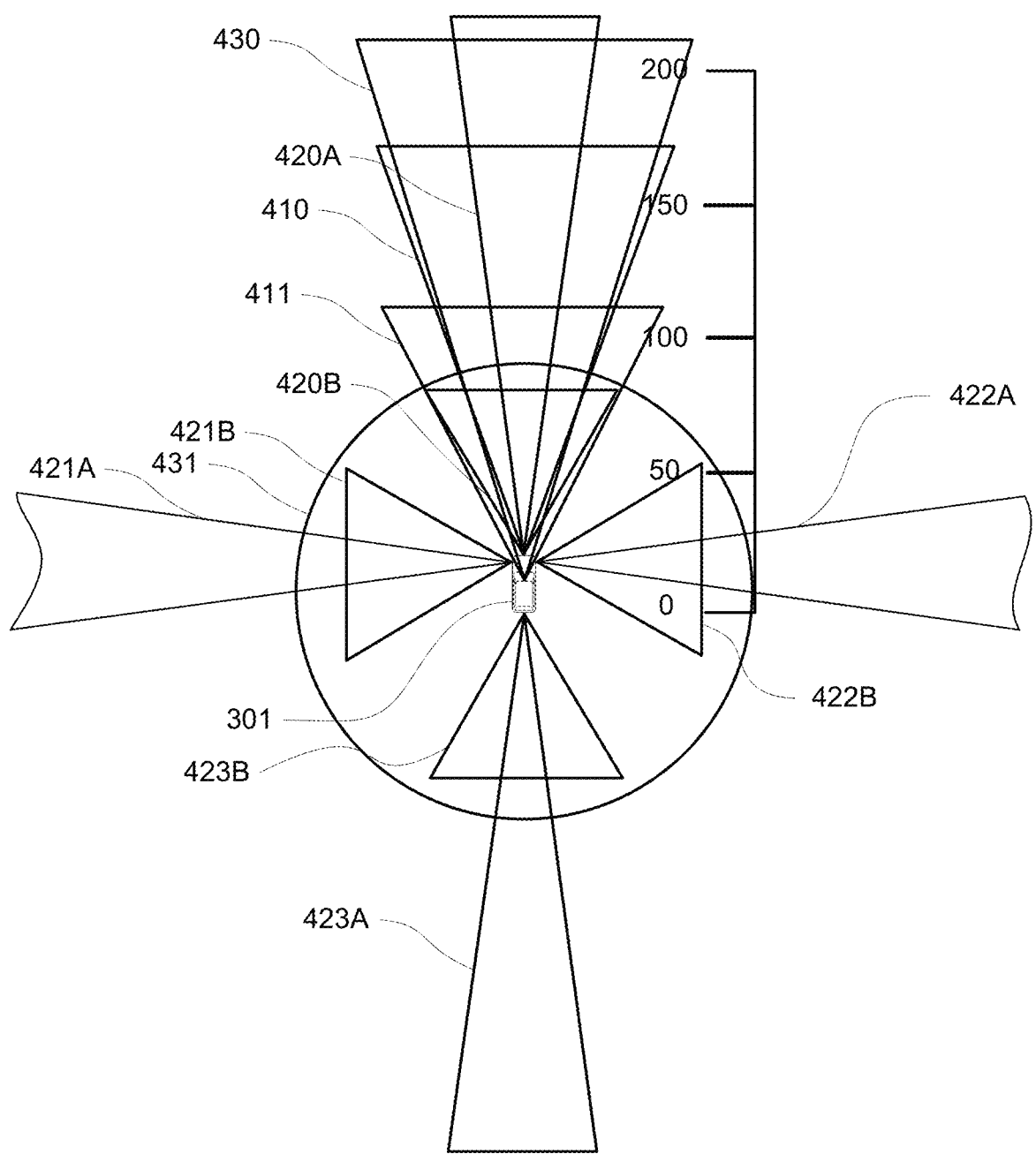
FIGS. 4A-D are diagrams of an autonomous vehicle in accordance with aspects of the disclosure.

Each sensor may be associated with a particular sensor field in which the sensor may be used to detect objects. FIG. 4A is a top-down view of the approximate sensor fields of the various sensors. Although these fields are shown in two dimensions (2D) in FIGS. 4A-4D, the actual sensor fields will be in three dimensions. FIG. 4B depicts the approximate 2D sensor fields 410 and 411 for lasers 310 and 311, respectively based on the fields of view for these sensors. For example, 2D sensor field 410 includes an approximately 30 degree horizontal field of view for approximately 150 meters, and sensor field 411 includes a 360 degree horizontal field of view for approximately 80 meters. The vertical field of view is not shown as these are only 2D examples.

Figure 4D:
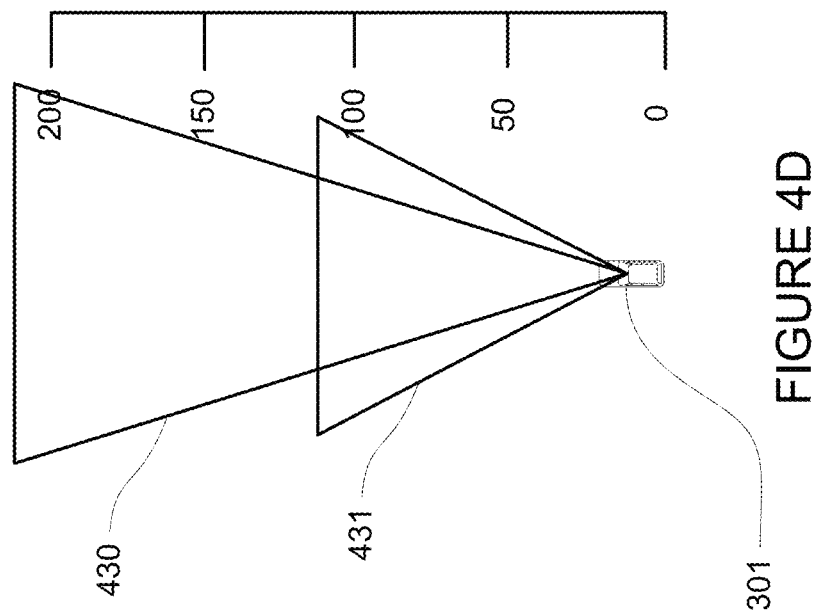
Figure 4B:
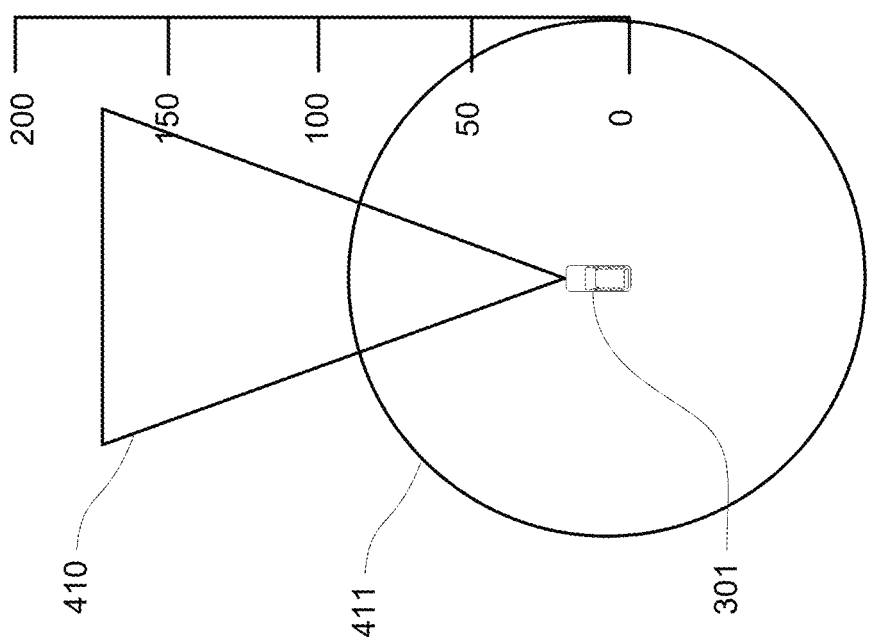
Figure 4C:
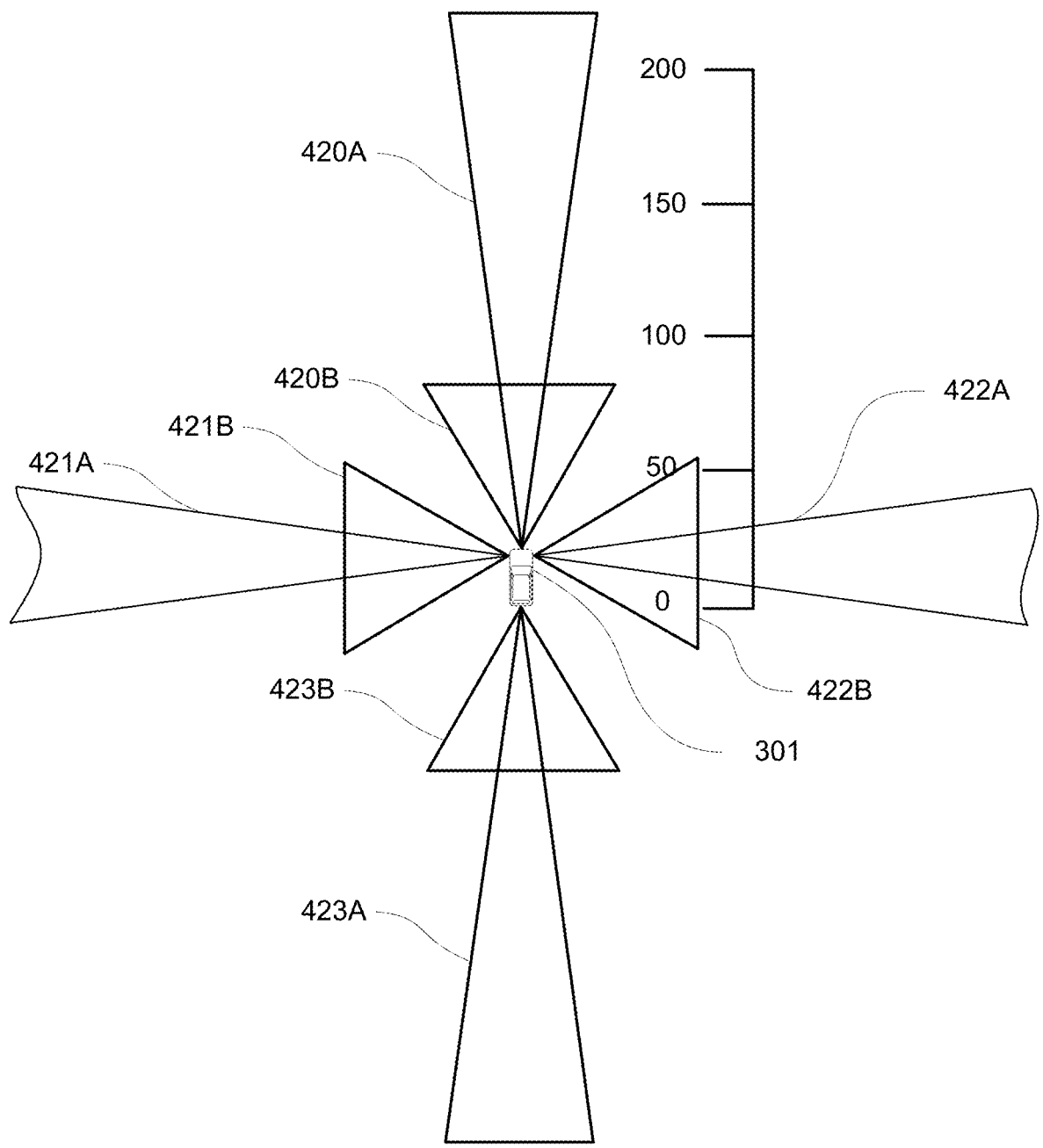

FIG. 4C depicts the approximate 2D sensor fields 420A-423B and for each of radar detection units 320-323, respectively, based on the fields of view for these sensors. For example, radar detection unit 320 includes sensor fields 420A and 420B. Sensor field 420A includes an approximately 18 degree horizontal field of view for approximately 200 meters, and sensor field 420B includes an approximately 56 degree horizontal field of view for approximately 80 meters. Similarly, radar detection units 321-323 include sensor fields 421A-423A and 421B-423B. Sensor fields 421A-423A include an approximately 18 degree horizontal field of view for approximately 200 meters, and sensor fields 421B-423B include an approximately 56 degree horizontal field of view for approximately 80 meters. Sensor fields 421A and 422A extend passed the edge of FIGS. 4A and 4C. Again, the vertical field of view is not shown as these are only 2D examples.

FIG. 4D depicts the approximate 2D sensor fields 430-431 cameras 330-331, respectively, based on the fields of view for these sensors. For example, sensor field 430 of camera 330 includes a field of view of approximately 30 degrees for approximately 200 meters, and sensor field 431 of camera 430 includes a field of view of approximately 60 degrees for approximately 100 meters. Again, the vertical field of view is not shown as these are only 2D examples.

The aforementioned sensors may allow the vehicle to evaluate and potentially respond to its environment in order to maximize safety for passengers as well as objects or people in the environment. The vehicle types, number and type of sensors, the sensor locations, the sensor fields of view, and the sensors' (2D or 3D) sensor fields are merely exemplary. Various other configurations may also be utilized.

In addition to the sensors described above, the computer may also use input from other sensors. For example, these other sensors may include tire pressure sensors, engine temperature sensors, brake heat sensors, break pad status sensors, tire tread sensors, fuel sensors, oil level and quality sensors, air quality sensors (for detecting temperature, humidity, or particulates in the air), etc.

Many of these sensors provide data that is processed by the computer in real-time, that is, the sensors may continuously update their output to reflect the environment being sensed at or over a range of time, and continuously or as-demanded provide that updated output to the computer so that the computer can determine whether the vehicle's then-current direction or speed should be modified in response to the sensed environment.

In addition to processing data provided by the various sensors, the computer may rely on environmental data that was obtained at a previous point in time and is expected to persist regardless of the vehicle's presence in the environment. For example, returning to FIG. 1, data 134 may include detailed map information 136, e.g., highly detailed maps identifying the shape and elevation of roadways, lane lines, intersections, crosswalks, speed limits, traffic signals, buildings, signs, real time traffic information, vegetation, or other such objects and information. For example, the map information may include explicit speed limit information associated with various roadway segments. The speed limit data may be entered manually or scanned from previously taken images of a speed limit sign using, for example, optical-character recognition.

The map information may include three-dimensional terrain maps incorporating one or more of objects listed above. For example, the vehicle may determine that another car is expected to turn based on real-time data (e.g., using its sensors to determine the current GPS position of another car) and other data (e.g., comparing the GPS position with previously-stored lane-specific map data to determine whether the other car is within a turn lane).

Figure 5:
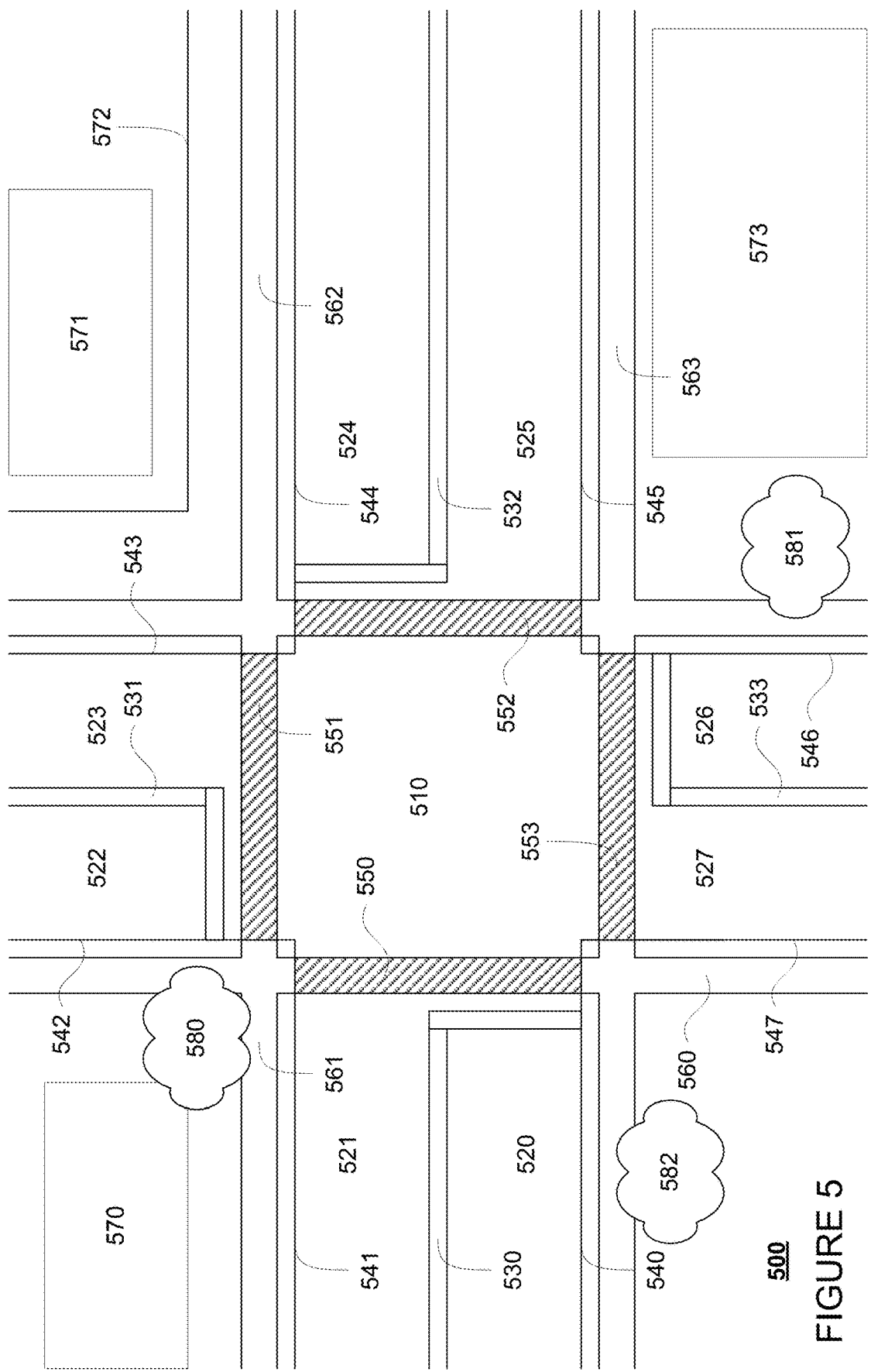
FIG. 5 is an example of detailed map information in accordance with aspects of the disclosure.

FIG. 5 is an example of map information 500 for a portion of a roadway including an intersection 510. In this example, intersection 510 is a four-way stop, though map information 136 may include any number of different roadway arrangements, combinations, and/or features as noted above. The map information includes lanes 520-527 defined by lane lines 530-533 and 540-547. The map information may also include details regarding the shape and location of cross walks 550-553. Beyond the bounds of the roadway, the map information 500 may also include features such as sidewalks 560-563, structures 570-573, and vegetation (such as trees) 580-582. Structures 570-573 may include various types of structures. For example, structures 570 and 571 may include buildings such as a garage, shop, home, office, etc. In another example, structure 572 may include a wall feature.

Again, although the detailed map information 136 is depicted herein as an image-based map, the map information need not be entirely image based (for example, raster). For example, the map information may include one or more roadgraphs or graph networks of information such as roads, lanes, intersections, and the connections between these features. Each feature may be stored as graph data and may be associated with information such as a geographic location and whether or not it is linked to other related features. For example, a stop sign may be linked to a road and an intersection. In some examples, the associated data may include grid-based indices of a roadgraph to allow for efficient lookup of certain roadgraph features.

The detailed map information may also be encoded with information regarding the probability of detecting objects in various areas. Map information 600 of FIG. 600 is an example of such map information. For example, instead of the vehicle's sensors having to see wall 572 and the vehicle's computer recognize this feature as a "wall," the map may note that wall 572 is opaque to the laser or radar, and thus, the map information 600 may include an area 610 associated with an annotation indicating that the probability of detecting something behind the wall 572 (or on the opposite side of the wall as the vehicle's sensors) is zero.

In another example, the map information 600 may indicate that wall 572 is 3 feet high. In this regard, the annotation for area 610 may note that for that area, there is a higher confidence of seeing an object taller than three feet and a lower confidence of seeing an object which is shorter than three feet. In this regard, objects defined in the detailed map information such as vegetation, buildings, walls, monuments, signs, towers, and other structures or objects may each be associated with a probability of the vehicle being able to detect another object of a particular size or shape on the opposite side of that structure as the vehicle's sensors.

Figure 6:
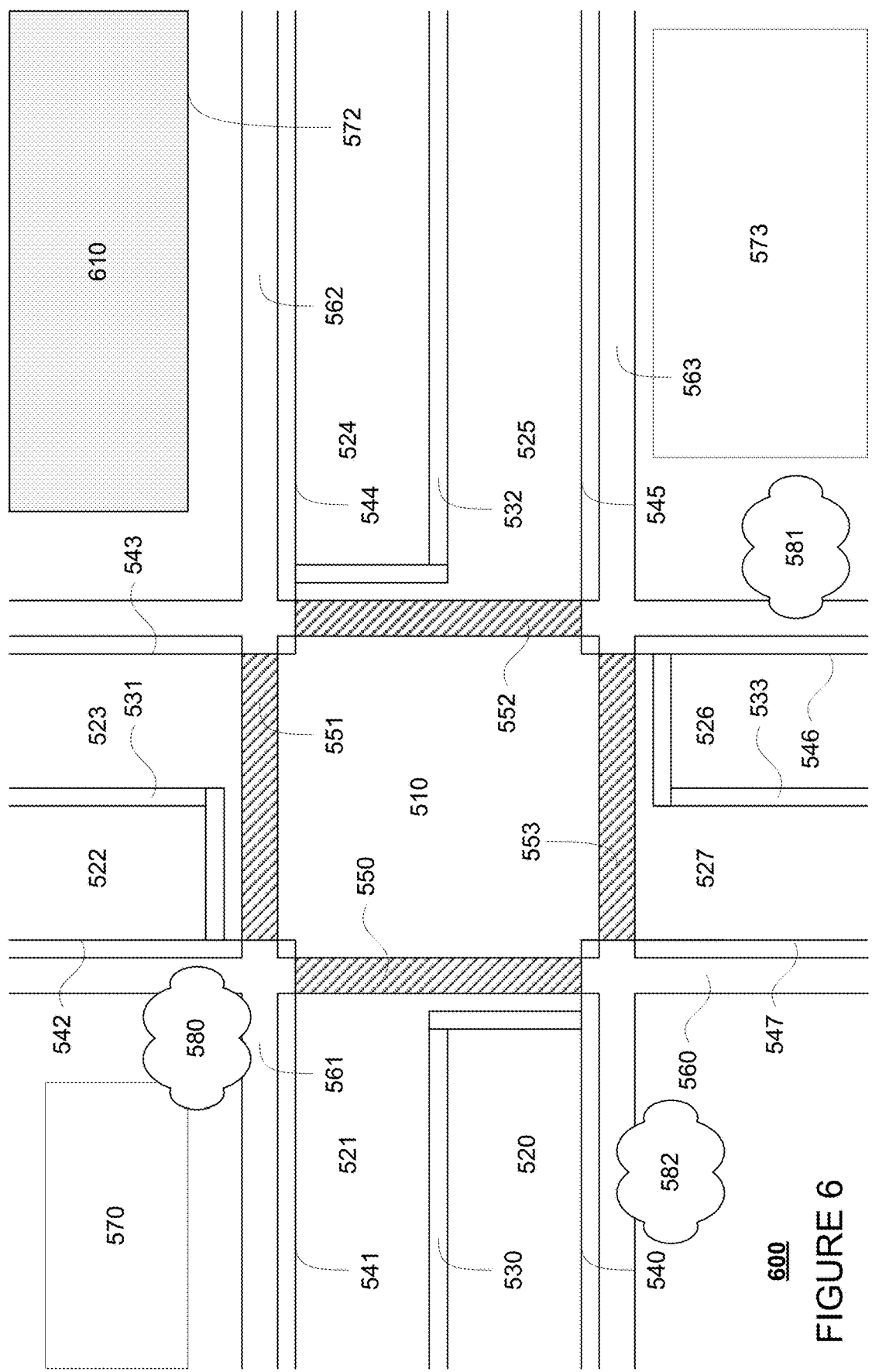
FIG. 6 is another example of detailed map information in accordance with aspects of the disclosure.

Computer 110 may also receive or transfer information to and from other computers. For example, the map information stored by computer 110 (such as the examples shown in FIGS. 5 and 6) may be received or transferred from other computers and/or the sensor data collected from the sensors of vehicle 101 may be transferred to another computer for processing as described herein. As shown in FIGS. 7A and 7B, data from computer 110 may be transmitted via a network to computer 720 for further processing. The network, and intervening nodes, may comprise various configurations and protocols including the Internet, World Wide Web, intranets, virtual private networks, wide area networks, local networks, private networks using communication protocols proprietary to one or more companies, Ethernet, WiFi and HTTP, and various combinations of the foregoing. Such communication may be facilitated by any device capable of transmitting data to and from other computers, such as modems and wireless interfaces. In another example, data may be transferred by storing it on memory which may be accessed by or connected to computers 110 and 720.

In one example, computer 720 may comprise a server having a plurality of computers, e.g., a load balanced server farm, that exchange information with different nodes of a network for the purpose of receiving, processing and transmitting the data from computer 110. The server may be configured similarly to the computer 110, with a processor 730, memory 740, instructions 750, and data 760.

In one example, data 760 of server 720 may include provide weather related information. For example, server 720 may receive, monitor, store, update, and transmit various information related to weather. This information may include, for example, precipitation, cloud, and/or temperature information in the form of reports, radar information, forecasts, etc.

In addition to the operations described above and illustrated in the figures, various operations will now be described. It should be understood that the following operations do not have to be performed in the precise order described below. Rather, various steps can be handled in a different order or simultaneously, and steps may also be added or omitted.

In order to determine the vehicle's sensor limitations and adjust the vehicle's behavior, the computer 110 may generate a 3D model how each of the vehicle's different sensors are currently able to see observing the vehicle's environment. This may include, for example, what areas the sensors are able to see if the sensor's field of view were completely unobstructed by objects, rather than what objects and features the sensors are currently seeing. These models may be based on each individual sensor's field of view given that sensor's location and orientation relative the vehicle. This information may be pre-determined, for example using a general calibration step, before determining each of the individual sensor models.

For example, FIGS. 8A and 8B include the components of an individual 3D model 800 for sensor 311. The model 800 for laser 311 may include the dimensions of 2D sensor field 411 shown in FIG. 8A (same as FIG. 4B) as well as a third, vertical dimension 811 shown in FIG. 8B. Thus, a combination of these components (411 and 811) may be used to generate a 3D model 800 for laser 311. Similar models may therefore also be generated for each of the sensors of the object detection component 148.

In addition, the individual sensor models may include probabilistic data which describes the confidence of detecting objects at various points or areas within a given sensor field. For example, a particular model may include information indicating the confidence of detecting objects within a given sensor field. For example, one model may have a higher confidence of detecting objects in the middle of a sensor field or within some distance of the sensor and a lower confidence at the outer edges of that sensor field.

FIGS. 9A and 9B are examples of the components of a 3D model 900 for laser 311 having probabilistic data. The shading of the components of the 3D model 900 is shown as darker at areas closer to laser 311 where the confidence of detecting an object is likely to be higher and lighter at areas further from laser 311 where the confidence of detecting an object is likely to be lower.

In another example, the models with probabilistic data may include very detailed information about the size and shape of objects that are likely to be detected at particular locations within the models. For example, the probabilistic data may describe an area where the sensor is 60% likely to see another vehicle, 20% to see a small non-metallic object, etc.

This initial modeling of individual sensors may also include leveraging information about the current state of the weather and adjusting the shape and or probability information for each individual sensor model in real time. For example, weather may be detected automatically, based on data received from the sensors for that particular model or a different sensor, and/or from real time information received from a central location such as server 520. In this regard, computer 110 may receive weather information, either from the sensors or a central location, and use this information to adjust the shape or other characteristics of the 3D models for each of the sensors. For example, a laser may be less reliable as a sensor if there is a significant amount of sun glare or precipitation. Similarly, radar units may be less reliable when used in foggy conditions, etc. Thus, an example approach would be to build parameterized models of the relevant weather conditions (e.g., fog density, rain intensity, ground wetness & reflectivity, sun intensity and direction, etc). Additionally, one may, a priori, construct a model of how such weather conditions affect the different sensors (e.g., reduction in effective laser range as a function of fog density, blind spots in the laser as a function of Sun intensity and direction, etc), and apply these adapted models for computing the online field of view of the sensors.

Next, the individual models of all the sensors may be aggregated to compute a comprehensive three-dimensional (3D) model of what areas the sensors are currently able to observe. This comprehensive model may be a binary map simply indicating areas where the vehicle can detect objects versus areas where the vehicle's sensors cannot detect objects. This information may already include the weather information incorporated into the individual models.

Figure 10:
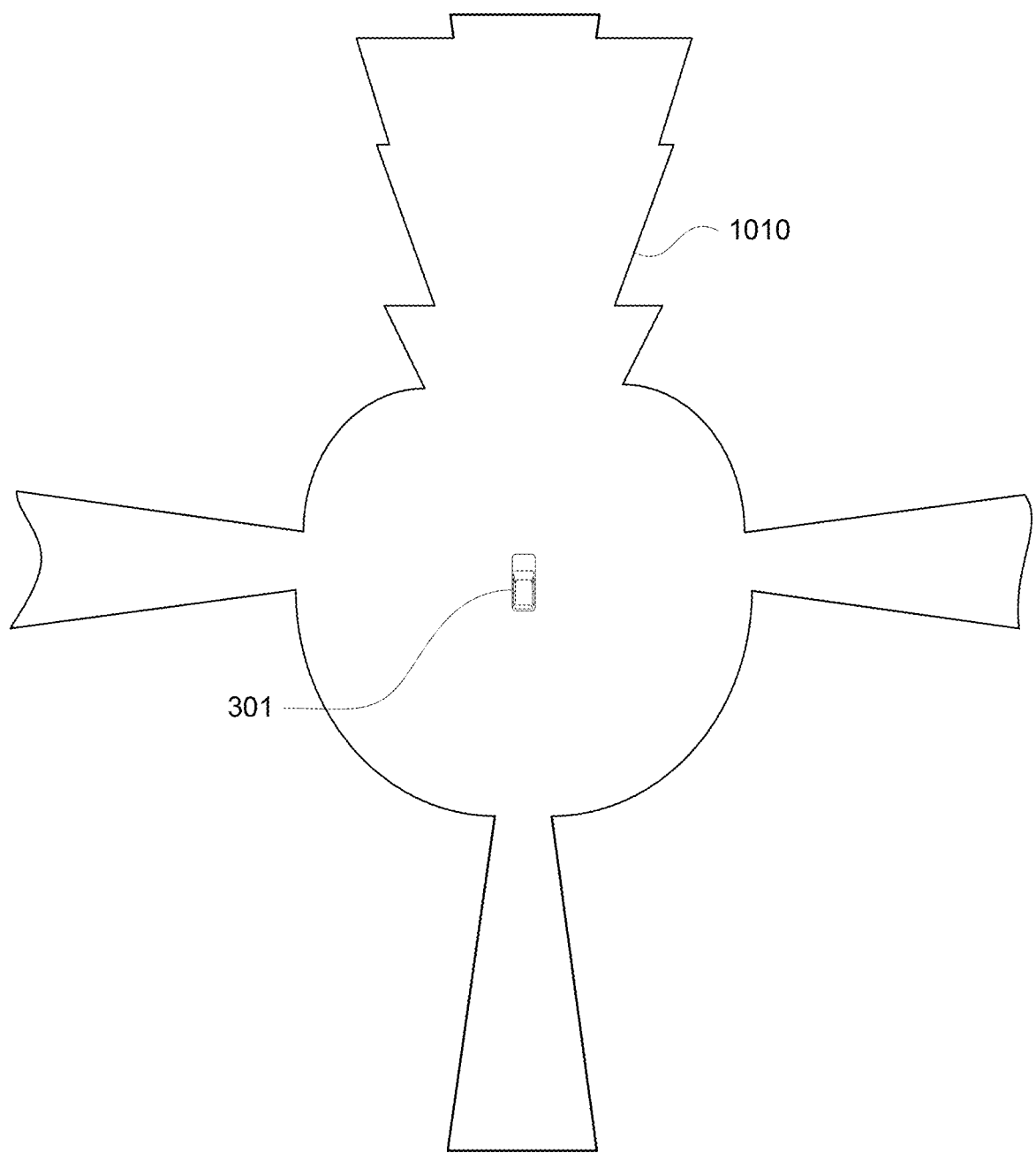
FIG. 10 is an example of a comprehensive 3D model for a plurality of sensors in accordance with aspects of the disclosure.

For example, FIG. 10 is an example of an aggregation of 2D sensor fields of the various sensors of object detection component 148. Again, although FIG. 10 is shown in 2D, the actual combined model may be in 3D. In this example, objects located within area 1010 (relative to the location of vehicle 301) may be detected by the vehicle's sensors while objects located outside of area 1010 cannot be detected.

If the individual models include probability data, the comprehensive 3D model may also include probability data. In this regard, the combined model can combine the probability of detection from the individual sensor models in various ways. In one example, the probability for each area of the 3D model may be the greatest probability of detection as determined by processing each probabilities of each of the individual sensor models. Thus, if one sensor model has a probability of 10% detection of an object the size of a small passenger car in location 1 and another sensor model has a probability of 20% detection of an object the size of a small passenger car in location 1, the probability of detection of an object the size of a small passenger car for location 1 may be 20%.

Figure 11:
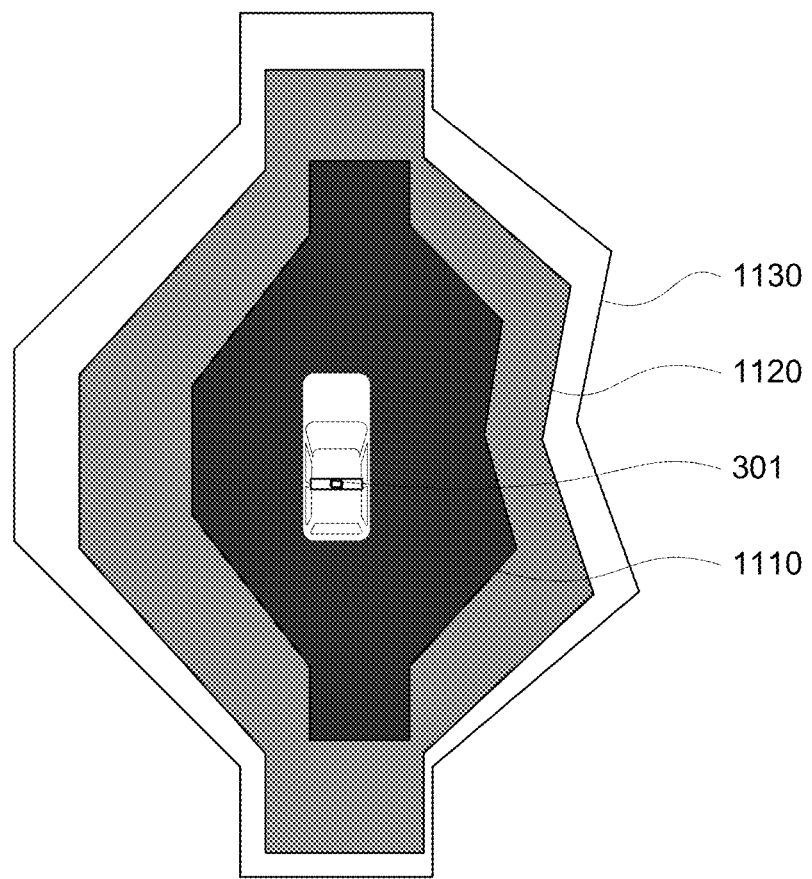
FIG. 11 is another example of a comprehensive 3D model for a plurality of sensors in accordance with aspects of the disclosure.

In another example, the probabilities may be combined in more complex ways, such as by having confidence regions or thresholds. FIG. 11 is another example of a comprehensive 3D model 1100 based on a plurality of models for individuals sensors. In this example, each of the individual models may already include weather information. Comprehensive 3D model 1100 also includes 3 confidence regions, 1110, 1120, and 1130. As indicated by the shading, region 1110 may have a higher confidence of detecting objects (for example greater than 70%) and features in the vehicle's environment than region 1120 (between 40 and 69%). Similarly, region 1120 may have a confidence of detecting objects and features than region 1130 (between 0 and 39%). Other comprehensive 3D models may include significantly more or less confidence regions, different types of confidence values, etc.

This combined model for a plurality of sensors may also be combined with the detailed map information 136 to compute sensor occlusions and blind spots. As noted above, the detailed map information 136 may be encoded with the probability of detecting objects. For example, using the current location of the vehicle, as determined from the vehicle's geographic position component, the computer 110 may identify a relevant portion of the detailed map information 136 and combine this information with the combined model. In this regard, the feature of the detailed map information 136, including the probability of detecting objects, may be used to adjust the combined model. The result of this combination or adjustment may be a model of the vehicle's environment annotated with information describing whether various portions of the environment are occupied, unoccupied, or unobserved (cannot be detected by the sensors). The occupied/free data might come from a combination of real-time sensor data (e.g., model the sensor occlusions from a truck) as well as prior data (e.g., a building near an intersection would block all sensors; tall grass & trees might interfere with lasers & cameras and perhaps partially block radar; a bridge or tunnel with metallic beams might interfere with radar, leading to areas with high noise levels, which would be equivalent to blind spots). These annotations may also include probability data as described above.

Figure 12:
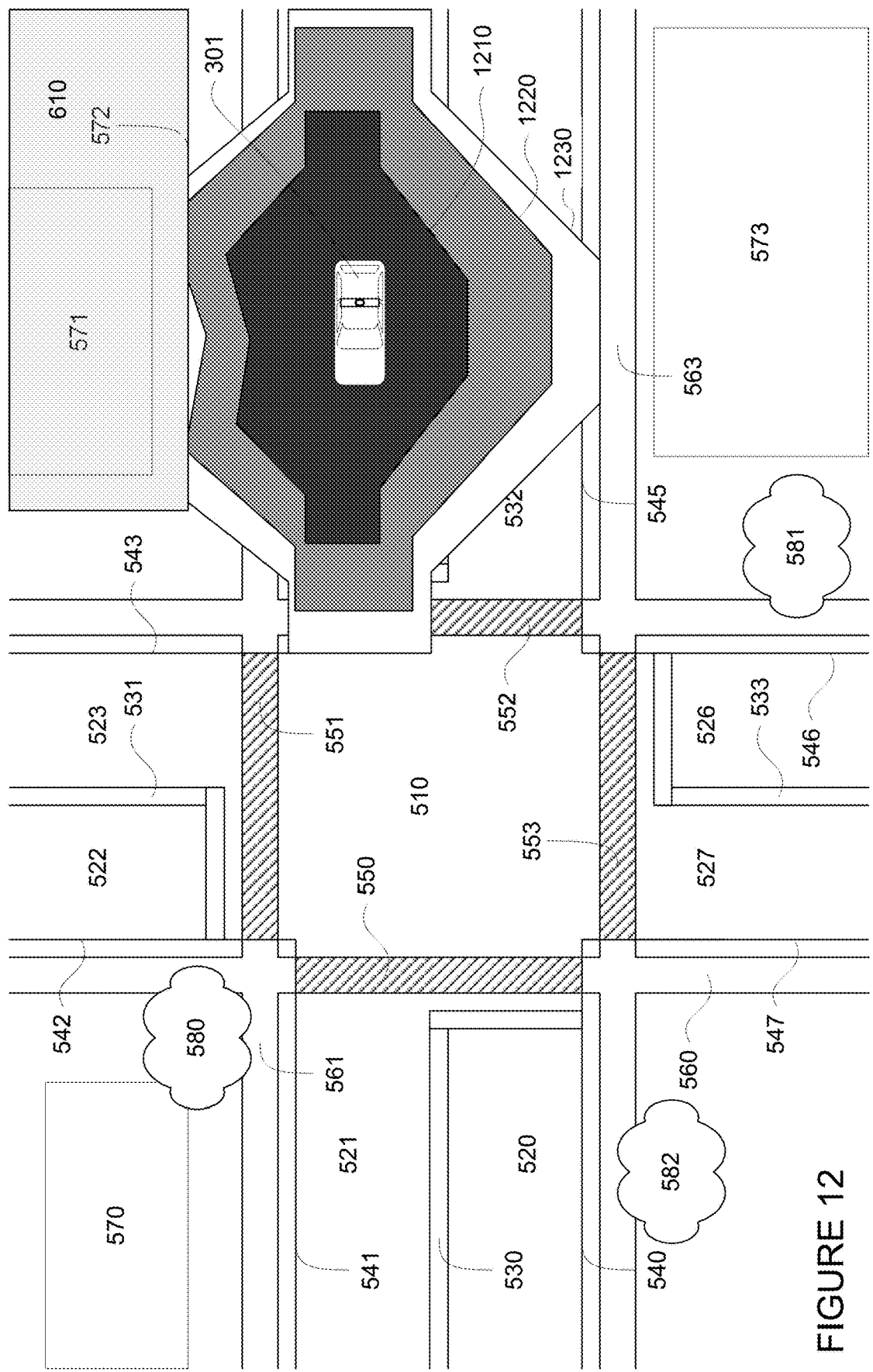
FIG. 12 is an example of a comprehensive 3D model for a plurality of sensors combined with detailed map information in accordance with aspects of the disclosure.

FIG. 12 is an example of a combination of map information 600 and comprehensive 3D model 1100. In this example, wall 572 occludes a portion of the 3D model 1100 as indicated by area 610. Thus, comprehensive 3D model is reconfigured with new confidence regions 1210, 1220, and 1230 corresponding to the confidence values of confidence regions 1100, 1120, and 1130, respectively.

Thus, the computer 110 does not have to reconstruct the geometry of the environment based on sensor data, as the vehicle's computer already has an expectation of what should and shouldn't be seen in the environment. Another advantage of using a prior map is that the system can reason about blind spots and occlusions at longer range (before the relevant objects come into sensing range), e.g., the system might know it is approaching a blind intersection significantly earlier than the onboard sensors are able to see the objects responsible for the occlusions, which means the vehicle can modify its behavior (e.g., start to slow down) earlier and drive smoother and safer.

The combined model and map may be used by the computer 110 to make driving decisions thereby improving safety. For example, the computer may cause the vehicle to slow down if its sensing range is diminished (e.g., driving in fog), reposition the vehicle to get a better view of the world, avoid certain types of risky maneuvers (e.g., passing using the oncoming-traffic lanes) if the computer not confident enough that the sensors are detecting enough of the environment.

Figure 13:
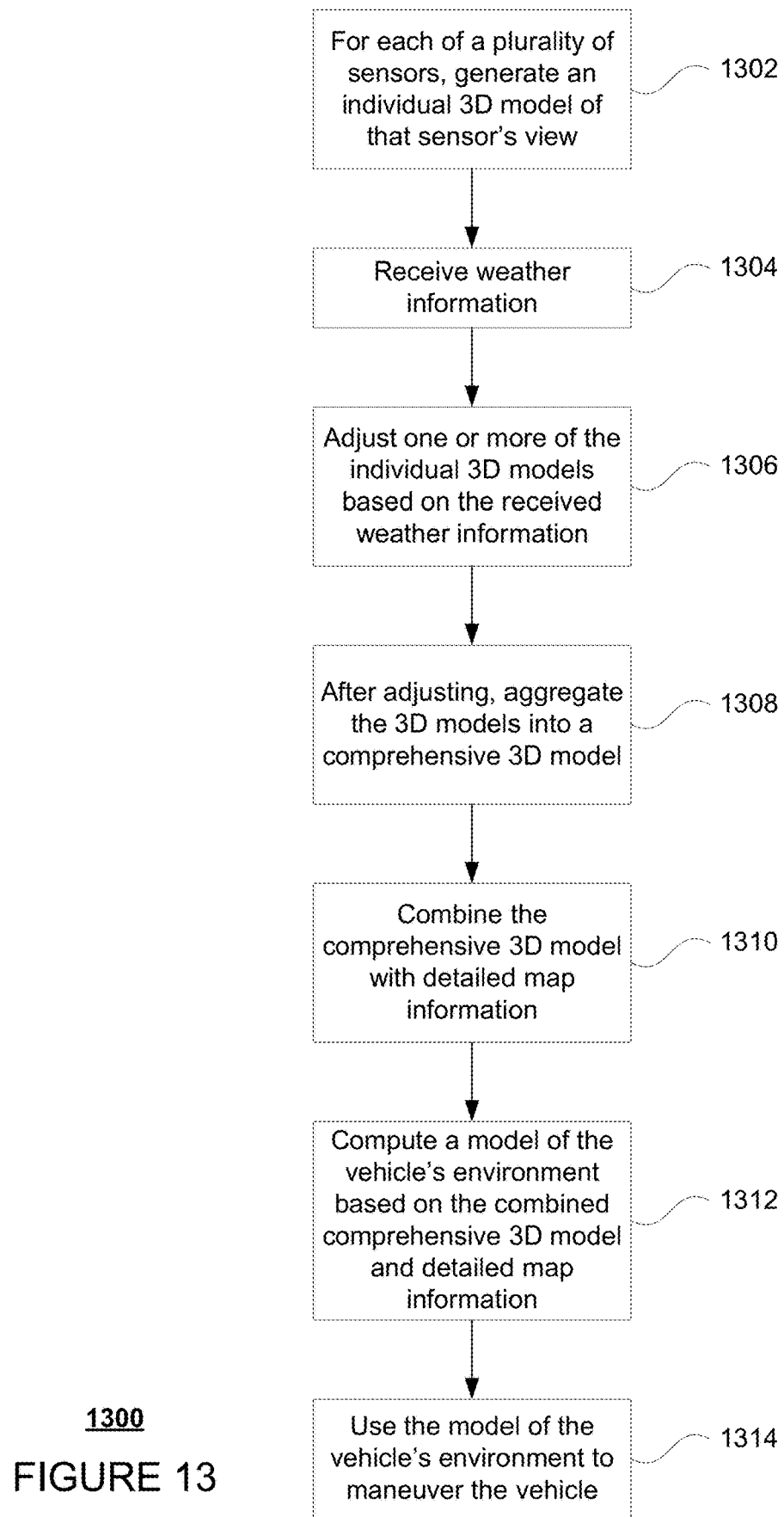
FIG. 13 is an example flow diagram in accordance with aspects of the disclosure.

Flow diagram 1300 of FIG. 13 is an example of some of the aspects described above which may be performed by computer 110. In this example, for each of a plurality of sensors of the object detection component, computer 110 generates an individual 3D model of that sensor's field of view at block 1302. Weather information is received at block 1304, for example from the sensors or from an external source, such as computer 520. The weather information may include, for example, precipitation, cloud, fog density, rain intensity, ground wetness and reflectivity, sun intensity and direction and/or temperature information. Such weather information may be the form of reports, radar information, forecasts, real-time measurements, etc. The computer then adjusts one or more characteristics of the 3D models based on the received weather information at block 1306. This accounts for an impact of the actual or expected weather conditions on one or more of the sensors. After this adjusting, the computer aggregates the 3D models into a comprehensive 3D model at block 1308. The comprehensive 3D model is then combined with detailed map information at block 1310. As noted above, this may include determining a current location of the vehicle and using this information to select a relevant portion of the detailed map information to be combined with the comprehensive 3D model. The computer then computes a model of the vehicle's environment based on the combined comprehensive 3D model and detailed map information at block 1312. This model of the vehicle's environment is then used to maneuver the vehicle at block 1314.

As these and other variations and combinations of the features discussed above can be utilized without departing from the subject matter as defined by the claims, the foregoing description of exemplary embodiments should be taken by way of illustration rather than by way of limitation of the subject matter as defined by the claims. It will also be understood that the provision of the examples described herein (as well as clauses phrased as "such as," "e.g.", "including" and the like) should not be interpreted as limiting the claimed subject matter to the specific examples; rather, the examples are intended to illustrate only some of many possible aspects.

We claim:

1. A method comprising:
receiving, by a computing system in a vehicle, information concerning a weather condition, wherein the computing system is configured to operate the vehicle based on data from at least one sensor coupled to the vehicle;
determining, by the computing system in the vehicle, an impact of the weather condition on a field of view of the at least one sensor;
determining, by the computing system in the vehicle, a driving decision based on at least the impact of the weather condition on the field of view of the at least one sensor; and
operating, by the computing system in the vehicle, the vehicle to carry out the determined driving decision.

2. The method of claim 1, wherein the weather condition is an actual weather condition.

3. The method of claim 1, wherein the weather condition is an expected weather condition.

4. The method of claim 1, wherein the weather condition comprises at least one of a fog density, a rain intensity, a ground wetness, a sun intensity, or a sun direction.

5. The method of claim 1, wherein the at least one sensor comprises at least one of a camera, a radar unit, or a laser.

6. The method of claim 1, wherein determining the impact of the weather condition on the field of view of the at least one sensor comprises:
obtaining a model of the at least one sensor's field of view, wherein the model of the sensor's field of view includes a vertical extent of the sensor's field of view, a horizontal extent of the sensor's field of view, and a range of the sensor's field of view; and
adjusting the model of the at least one sensor's field of view based on the weather condition.

7. The method of claim 1, wherein the computing system is configured to operate the vehicle based on data from a plurality of sensors coupled to the vehicle, and wherein determining the impact of the weather condition on the field of view of the at least one sensor comprises:
obtaining, for each given sensor of the plurality of sensors, an individual model of the given sensor's field of view, to provide a plurality of individual models; and
adjusting one or more of the individual models based on the weather condition.

8. The method of claim 1, wherein operating, by the computing system in the vehicle, the vehicle to carry out the determined driving decision comprises:
operating, by the computing system in the vehicle, the vehicle to slow down.

9. The method of claim 1, wherein operating, by the computing system in the vehicle, the vehicle to carry out the determined driving decision comprises:
operating, by the computing system in the vehicle, the vehicle to a position that improves a view of the at least one sensor.

10. The method of claim 1, wherein operating, by the computing system in the vehicle, the vehicle to carry out the determined driving decision comprises:
operating, by the computing system in the vehicle, the vehicle to avoid a certain type of maneuver.

11. A system comprising:
at least one sensor coupled to a vehicle;
at least one processor;
at least one memory;
instructions stored in the at least one memory and executable by the at least one processor to perform operations comprising:
receiving information concerning a weather condition;
determining an impact of the weather condition on a field of view of the at least one sensor;
determining a driving decision based on at least the impact of the weather condition on the field of view of the at least one sensor; and
operating the vehicle to carry out the determined driving decision.

12. The system of claim 11, wherein the weather condition is an actual weather condition.

13. The system of claim 11, wherein the weather condition is an expected weather condition.

14. The system of claim 11, wherein the weather condition comprises at least one of a fog density, a rain intensity, a ground wetness, a sun intensity, or a sun direction.

15. The system of claim 11, wherein the at least one sensor comprises at least one of a camera, a radar unit, or a laser.

16. The system of claim 11, wherein determining the impact of the weather condition on the field of view of the at least one sensor comprises:
obtaining a model of the at least one sensor's field of view, wherein the model of the sensor's field of view includes a vertical extent of the sensor's field of view, a horizontal extent of the sensor's field of view, and a range of the sensor's field of view; and
adjusting the model of the at least one sensor's field of view based on the weather condition.

17. The system of claim 11, wherein the system comprises a plurality of sensors coupled to the vehicle, and wherein determining the impact of the weather condition on the field of view of the at least one sensor comprises:
obtaining, for each given sensor of the plurality of sensors, an individual model of the given sensor's field of view, to provide a plurality of individual models; and
adjusting one or more of the individual models based on the weather condition.

18. The system of claim 11, wherein operating the vehicle to carry out the determined driving decision comprises operating the vehicle to slow down.

19. The system of claim 11, wherein operating the vehicle to carry out the determined driving decision comprises operating the vehicle to a position that improves a view of the at least one sensor.

20. The system of claim 11, wherein operating the vehicle to carry out the determined driving decision comprises operating the vehicle to avoid a certain type of maneuver.

* * * * *